(12) United States Patent
Shiraishi et al.

(10) Patent No.: US 6,459,548 B1
(45) Date of Patent: Oct. 1, 2002

(54) HEAD SUSPENSION ASSEMBLY WITH FLEXIBLE AIR-FLOATING LEAD

(75) Inventors: Masashi Shiraishi, Tokyo (JP); Takeshi Wada, Tokyo (JP); Mitsuyoshi Kawai, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 09/576,230

(22) Filed: May 22, 2000

(30) Foreign Application Priority Data

Jun. 3, 1999 (JP) .......................................... 11-156585

(51) Int. Cl.[7] .............................................. G11B 21/16
(52) U.S. Cl. ................................................... 360/245.9
(58) Field of Search ...................................... 360/245.9

(56) References Cited

U.S. PATENT DOCUMENTS

| 5,541,788 A | 7/1996 | Ishida et al. |
| 5,745,319 A | 4/1998 | Takekado et al. ........ 360/78.05 |
| 5,859,746 A | 1/1999 | Ishida et al. |
| 6,078,473 A * | 6/2000 | Crane et al. ............. 360/294.3 |

FOREIGN PATENT DOCUMENTS

JP          8-180623          7/1996

* cited by examiner

*Primary Examiner*—George J. Letscher
(74) *Attorney, Agent, or Firm*—Armstrong, Westerman & Hattori, LLP

(57) ABSTRACT

A head suspension assembly includes a magnetic head slider with at least one thin-film magnetic head element, an actuator fixed to the magnetic head slider for performing precise positioning of the at least one thin-film magnetic head element, a support member for supporting the actuator, a flexible first lead conductor member with one end electrically connected to the at least one thin-film magnetic head element, at least part of the first lead conductor member being formed on the support member, and a second lead conductor member with one end electrically connected to the actuator. At least part of the second lead conductor member is formed on the support member. The support member has a first portion on which the one end of the first lead conductor member is formed and a second portion. The first portion is individually separated from the second portion.

14 Claims, 6 Drawing Sheets

HEAD SUSPENSION ASSEMBLY WITH FLEXIBLE AIR-FLOATING LEAD

FIELD OF THE INVENTION

The present invention relates to a head suspension assembly with a precise positioning actuator, used for a magnetic disk device, and to a method of manufacturing the assembly.

DESCRIPTION OF THE RELATED ART

In such magnetic disk device, a thin-film magnetic head element for writing magnetic information into and/or reading magnetic information from a magnetic disk is in general formed on a magnetic head slider flying in operation above the rotating magnetic disk. The slider is supported at a top end section of a suspension extended from one end of each movable arm of the magnetic disk device.

Recently, recording density along the radial direction in the magnetic disk or along the track width direction rapidly increases to satisfy the requirement forever increasing data storage capacities and densities in today's magnetic disk devices. Thus, it is difficult to perform correct positioning of the magnetic head with respect to the track in the magnetic disk by the control of only a voice coil motor (VCM) as the conventional art.

Techniques for realizing precise positioning of a magnetic head are described in for example U.S. Pat. No. 5,745,319 and Japanese unexamined patent publication No. 8-180623. In these techniques, another actuator mechanism is presented at a position nearer to a magnetic head slider than the conventional VCM so as to perform fine precise positioning that cannot be realized by the VCM only.

However, if such additional actuator is adopted, problems may be occurred due to lead lines between the magnetic head and the additional actuator. In a typical magnetic head, for example a composite type magnetic head with a read head part of a magnetoresistive effect (MR) transducer element and a write head part of an inductive transducer element, four or more lead lines are required for reading and writing operations and two or more additional lead lines are required for driving the actuator. Thus, it is necessary to make six or more lead lines on a suspension. Since the total width of the lead lines increases, the elasticity and the rigidity of the lead lines become large causing an attitude of the magnetic head and a movement performance of the head by mean of the actuator to affect. Furthermore, there is no space to form so many lead lines within a tongue at which the additional actuator and the magnetic head slider are attached.

The additional actuator drives the magnetic head slider to move its top end section having the magnetic head element in the track width direction. However, this movement of the slider will also produce movement at electrical connection part between the magnetic head slider and the lead lines fixed to the suspension causing an electrical or mechanical break in the coupled part.

SUMMARY OF THE INVENTION

It is therefore an object of the present invention to provide a head suspension assembly with a precise positioning actuator and a method of manufacturing the assembly, whereby an attitude a magnetic head will not be so affected by elasticity and rigidity of lead lines.

Another object of the present invention is to provide a head suspension assembly with a precise positioning actuator and a method of manufacturing the assembly, whereby a movement performance of a magnetic head by the actuator will not be so affected by elasticity and rigidity of lead lines.

Further object of the present invention is to provide a head suspension assembly with a precise positioning actuator and a method of manufacturing the assembly, whereby an electrical or mechanical break in a connection part between a magnetic head element and lead lines can be prevented from occurring.

According to the present invention, a head suspension assembly includes a magnetic head slider with at least one thin-film magnetic head element, an actuator fixed to the magnetic head slider for performing precise positioning of the at least one thin-film magnetic head element, a support member for supporting the actuator, a flexible first lead conductor member with one end electrically connected to the at least one thin-film magnetic head element, at least part of the first lead conductor member being formed on the support member, and a second lead conductor member with one end electrically connected to the actuator. At least part of the second lead conductor member is formed on the support member. The support member has a first portion on which the one end of the first lead conductor member is formed and a second portion. The first portion is individually separated from the second portion.

According to the conventional three-pieces structure suspension with a load beam, a flexure and a lead conductor formed on the flexure, if an actuator is located between the suspension and a magnetic head slider, lead lines for the magnetic head slider cannot be made as a part of the lead conductor formed on the flexure. Thus, it is necessary to use lead wires for the connection with the magnetic head slider. According to the present invention, however, the support member is divided into a first portion on which one end connected to the magnetic head slider of the first lead conductor member is formed and a second portion so that the first portion is individually separated from the second portion. Thus, it is possible to exist the first lead conductor member in different planes and therefore wireless lead conductor can be provided. Furthermore, since the first portion or a top end portion of the support member is individually separated from the second portion or the other portion, a part for establishing electrical connection with the actuator and a part for establishing electrical connection with the magnetic head element of the lead conductor member are divided. Therefore, wireless lead conductor members can be provided without introducing any interference between the movements of the lead conductor members even when the actuator displaces the position of the magnetic head element. As a result, the elasticity and the rigidity of the lead conductor members will not affect an attitude of the magnetic head. In addition, since an air-floating portion of the flexible first lead conductor member absorbs the movement of the actuator, electrical and/or mechanical break at the electrical connection part with the magnetic head element can be prevented from occurring.

Since no wired connection is used for establishing electrical connections with the actuator and the magnetic head element, no wire-forming process is needed resulting improvement in productivity and improvement in the resistance characteristics against static electricity.

It is preferred that the actuator and the magnetic head slider are located at one face side of the support member. In this case, the support member may include a resilient load beam and a resilient flexure supported by the load beam, and at least part of the first and second lead conductor members may be formed on one face of the flexure. Also, in this case, the support member may include a resilient flexure-load beam, and at least part of the first and second lead conductor members may be formed on one face of the flexure-load beam.

It is also preferred that the magnetic head slider is located at one face side of the support member and the actuator is located at the other face side of the support member. In this case, the support member may include a resilient flexure-load beam, and at least part of the first and second lead conductor members may be formed on one face of the flexure-load beam.

It is preferred that the support member has a via section, and that the actuator is connected to the one end of the second lead conductor member through the via section.

It is preferred that the first and second portions of the support member are located in different planes, and that the first lead conductor member can be freely curved from the first portion to the second portion.

It is also preferred that the first portion of the support member has at least one via hole. In this case, the actuator may be directly fixed to the magnetic head slider through the at least one via hole. The at least one via hole may be via holes for reducing a weight of the first portion.

Preferably, the one end of the first lead conductor member is directly connected to terminals of the at least one thin-film magnetic head element by ball bonding or by stitch bonding.

It is preferred that the first and second lead conductor members are formed by flexible print circuits with lead conductor layers sandwiched by insulation layers.

According to the present invention, furthermore, a manufacturing method of a head suspension assembly which includes a magnetic head slider with at least one thin-film magnetic head element, an actuator fixed to the magnetic head slider for performing precise positioning of the at least one thin-film magnetic head element, a support member for supporting the actuator, a flexible first lead conductor member, at least part of the first lead conductor member being formed on the support member, and a second lead conductor member, at least part of the second lead conductor member being formed on the support member has the steps of electrically connecting one end of the first lead conductor member to the at least one thin-film magnetic head element, electrically connecting one end of the second lead conductor member to the actuator, and thereafter, cutting the support member into first and second portions so that the first portion on which the one end of the first lead conductor member is formed is individually separated from the second portion.

If the suspension is separated before assembling it with the actuator and the slider, workability of the assembly process will be extremely reduced. However, according to the present invention, since cutting of the first portion or top end portion of the support member is performed after assembling of the magnetic head slider, the actuator and the suspension, a wireless suspension can be provided without reducing the workability of the assembly process.

It is preferred that the support member includes a resilient load beam and a resilient flexure supported by the load beam, and that at least part of the first and second lead conductor members are formed on one face of the flexure.

It is also preferred that the support member includes a resilient flexure-load beam, and that at least part of the first and second lead conductor members are formed on one face of the flexure-load beam.

It is preferred that the first lead conductor member is formed so as to be freely curved from the first portion to the second portion.

It is also preferred that the one end of the first lead conductor member is directly connected to terminals of the at least one thin-film magnetic head element by ball bonding or by stitch bonding.

Further objects and advantages of the present invention will be apparent from the following description of the preferred embodiments of the invention as illustrated in the accompanying drawings.

DESCRIPTION OF THE PREFERRED EMBODIMENTS

Figure 1:
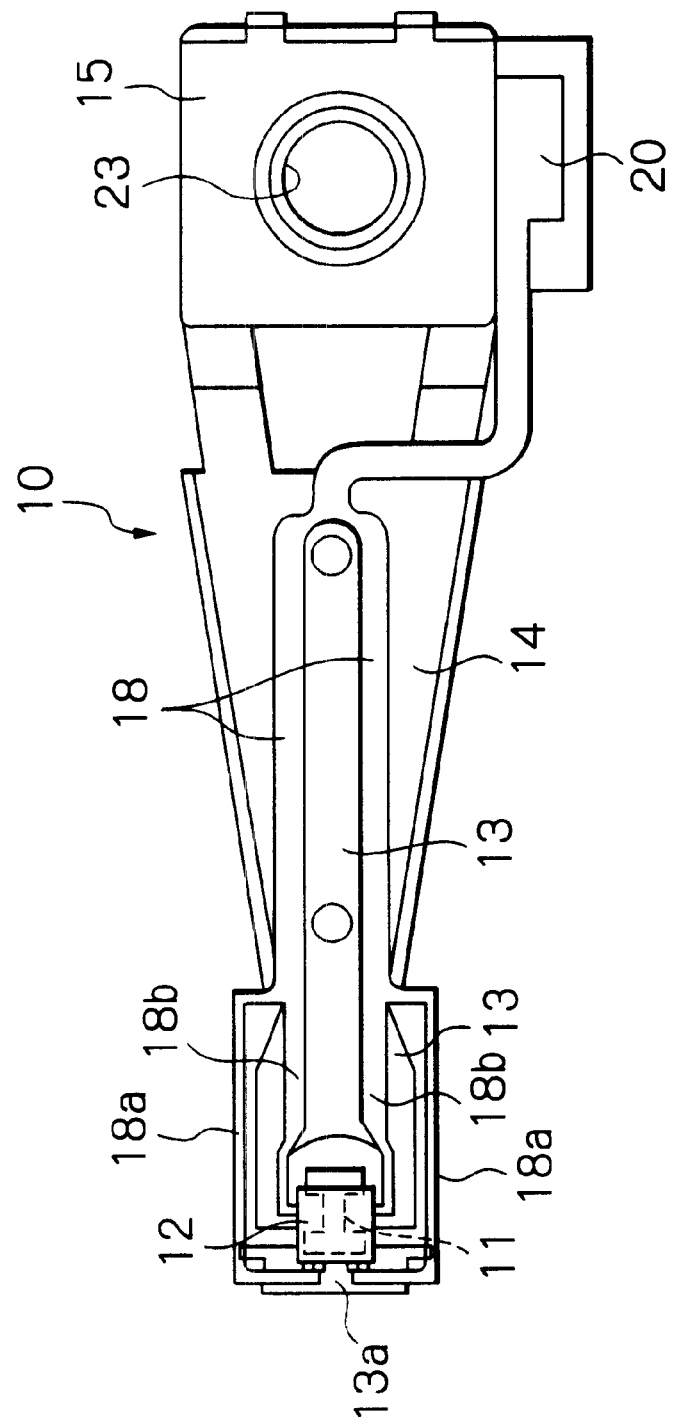
FIG. 1 is a plane view schematically illustrating whole structure of a head suspension assembly as a preferred embodiment according to the present invention.
Figure 2:
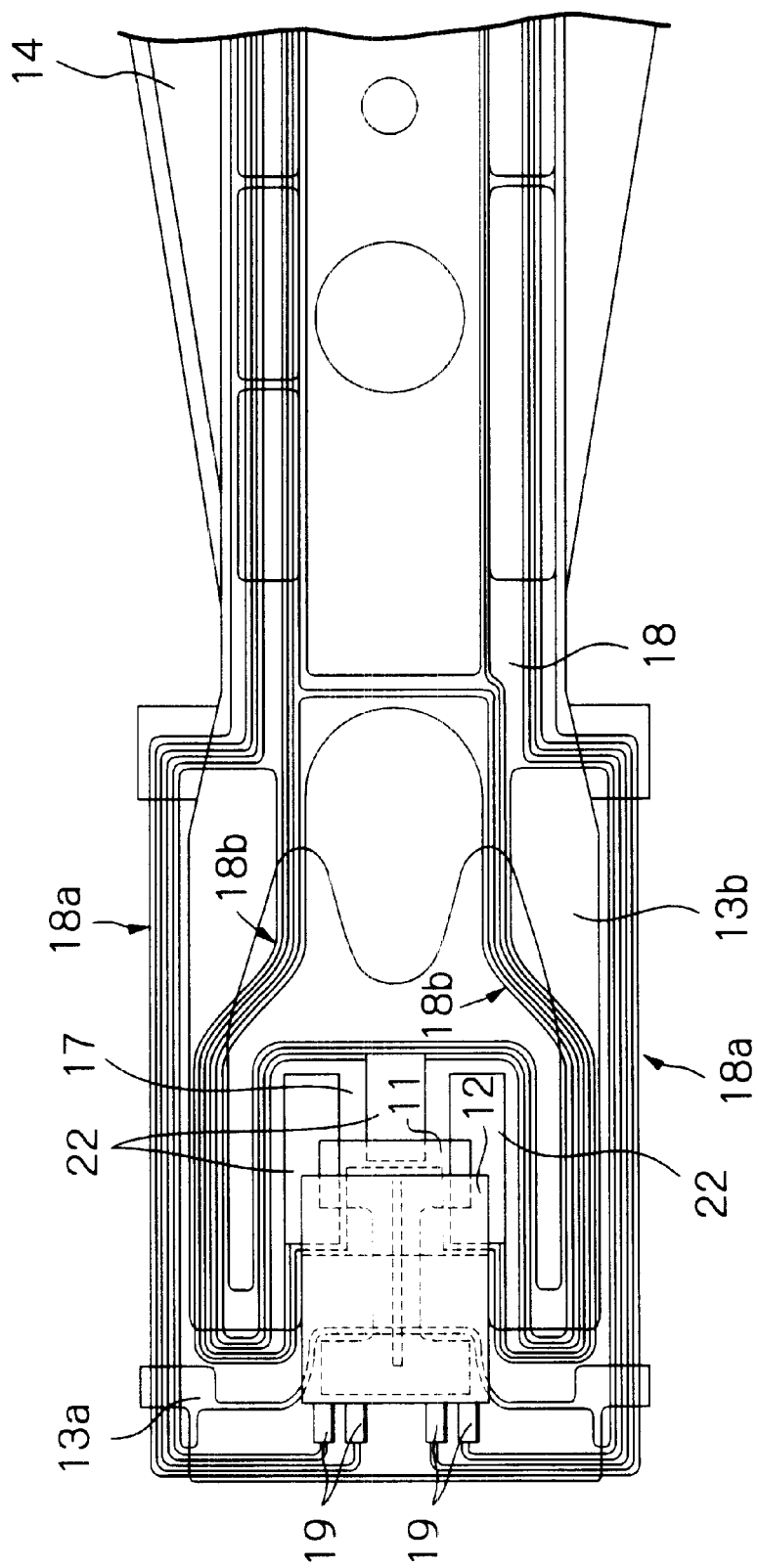
FIG. 2 is a plane view illustrating a top end section of the head suspension assembly shown in FIG. 1.
Figure 3:
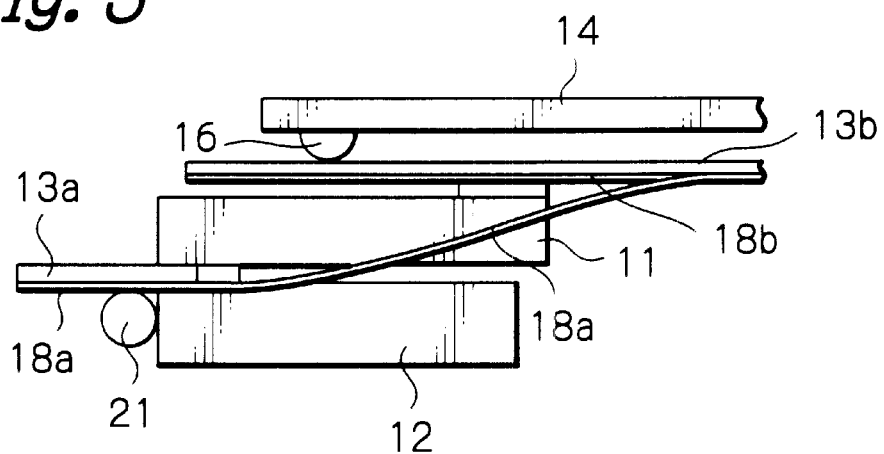
FIG. 3 is a side view schematically illustrating three-dimensional structure of the top end section of the head suspension assembly shown in FIG. 1.

FIG. 1 schematically illustrates whole structure of a head suspension assembly in a preferred embodiment according to the present invention and FIG. 2 illustrates in detail a top end section of the head suspension assembly. These figures are plane views seen from a slider-attached side. FIG. 3 is a side view schematically illustrating three-dimensional structure of the top end section of the head suspension assembly.

As shown in these figures, a head suspension assembly is assembled by fixing a fine tracking actuator 11 for precise positioning of a thin-film magnetic head element to a top end section of a suspension 10, and by fixing a slider with the magnetic head element to the actuator 11.

As is well known, a magnetic disk device has a main or course actuator of VCM for rotationally moving a movable arm to which such head suspension assembly is attached. The actuator 11 shares the fine positioning of the assembly, which cannot be adjusted by the main or course actuator.

The actuator 11 has as will be described in detail later a single layer structure or a multi-layered structure including a piezoelectric or electrostrictive material layer which expands and contracts by their reverse piezoelectric effect or electrostrictive effect. The actuator 11 is mechanically coupled to a magnetic head slider 12 and mechanically and electrically coupled to the suspension 10. The size of the actuator 11 is substantially equal to that of the magnetic head slider 12 with for example 1.25 mm×1.0 mm×0.3 mm. In this embodiment, the actuator 11 is mounted at a position of the top end section of the suspension 10, near the slider 12, in consideration of its mechanical and electrical performance.

In the embodiment, also, both the actuator 11 and the slider 12 are fixed on a surface of the suspension 10, which will oppose to the magnetic disk surface in operation. This surface of the suspension is called hereinafter as a slider-attached surface.

Although it is not shown in the figures, a head driver IC chip may be mounted on a middle location of the suspension 10.

The suspension 10 is substantially constituted by a resilient flexure 13 which carries the slider 12 through the actuator 11 at its tongue 17 located near its top end section, a resilient load beam 14 which supports and fixes the flexure 13, and a base plate 15 formed at a base end section of the load beam 14.

The load beam 14 has elasticity for pressing the slider 12 through the actuator 11 toward the direction of a magnetic disk in operation.

The flexure 13 has the flexible tongue 17 depressed by a dimple formed on the load beam 14 and has elasticity for supporting flexibly the slider 12 through the actuator 11 by this tongue. As will be noted, in this embodiment, the suspension 10 has a three-pieces structure constituted by individual components of the flexure 13, the load beam 14 and the base plate 15. In such three-pieces structure, stiffness of the flexure 13 is set to be lower than that of the load beam 14.

The flexure 13 is made of in this embodiment a stainless steel plate (for example SUS304TA) with a thickness of about 25 $\mu$m. As will be described later, a top end portion 13a of the flexure 13 is separated from other portion 13b of the flexure 13.

On the flexure 13 and out of the flexure 13, a flexible lead conductor member 18 including a plurality of lead conductors of a thin-film multi-layered pattern is formed. The lead conductor member 18 is formed by a known method similar to the patterning method of forming a printed circuit board on a thin metal plate such as a flexible printed circuit (FPC). For example, the member 18 is formed by sequentially depositing a first insulation material layer made of a resin such as polyimide with a thickness of about 5 $\mu$m, a patterned Cu layer (lead conductor layer) with a thickness of about 4 $\mu$m, and a second insulation material layer made of a resin such as polyimide with a thickness of about 5 $\mu$m on the flexure 13 in this order. Within the regions of the connection pads to the magnetic head slider and to an external circuit, an Au layer is deposited on the Cu layer and there is no second insulation material layer on the Au layer.

In this embodiment, as shown in FIG. 2 in detail, the lead conductor member 18 is constituted by a first conductor member 18a including two lead lines connected to the magnetic head element for one side, thus four lead lines for both sides, and a second conductor member 18b including two lead lines connected to the actuator 11 for one side, thus four lead lines for both sides.

One end of the lead lines of the first conductor member 18a is connected to connection pads 19 formed on the individually separated top end portion 13a of the flexure 13, which is a second part of a support member also including portion 13b. The connection pads 19 are ball-bonded to terminal electrodes of the magnetic head slider 12 by Au balls 21 as shown in FIG. 3. The other end of the lead lines of the first conductor member 18a is connected to connection pads 20 provided for connection with an external circuit.

As shown in FIG. 3, the first conductor member 18a consists of a first section formed on the other portion 13b of the flexure 13, which is a first part of the support member. A second section floating in the air at both sides of the actuator 11 and the magnetic head slider 12, and a third section formed on the individually separated top end portion 13a of the flexure 13. The top end portion 13a and the other portion 13b of the flexure 13 are located in different planes, respectively. However, since the air-floating section of the first conductor member 18a can freely bend, electrical connection between the conductor member 18a and the magnetic head element can be ensured without applying stress to the individually separated top end portion 13a of the flexure 13.

Instead of the ball bonding, stitch bonding can be executed for connecting the terminal electrodes of the magnetic head slider 12 with the connection pads 19.

One end of lead lines of the second conductor member 18b is connected to connection pads 22 formed on the tongue 17 of the flexure 13. The connection pads 22 are connected to terminal electrodes of the actuator 11. The other end of lead lines of the second conductor member 18b is connected to the connection pads 20 provided for connection with an external circuit.

The load beam 14 is made of in this embodiment a resilient stainless steel plate with a thickness of about 60–65 $\mu$m and supports the other portion 13b of the flexure 13 along its whole length. This load beam 14 has a shape with a width that narrows with approaching to its top end. Fixing of the flexure 13 to the load beam 14 is achieved by means of a plurality of welded spots.

The base plate 15 is made of a stainless steel or iron and is fixed to the base end section of the load beam 14 by welding. The suspension 10 will be attached to each movable arm (not shown) by fixing an attachment part 23 of the base plate 15 to the movable arm.

In modification, the suspension may be formed in a two-pieces structure with a base plate and a flexure-load beam instead of the three-pieces structure with the flexure 13, the load beam 14 and the base plate 15.

Figure 4:
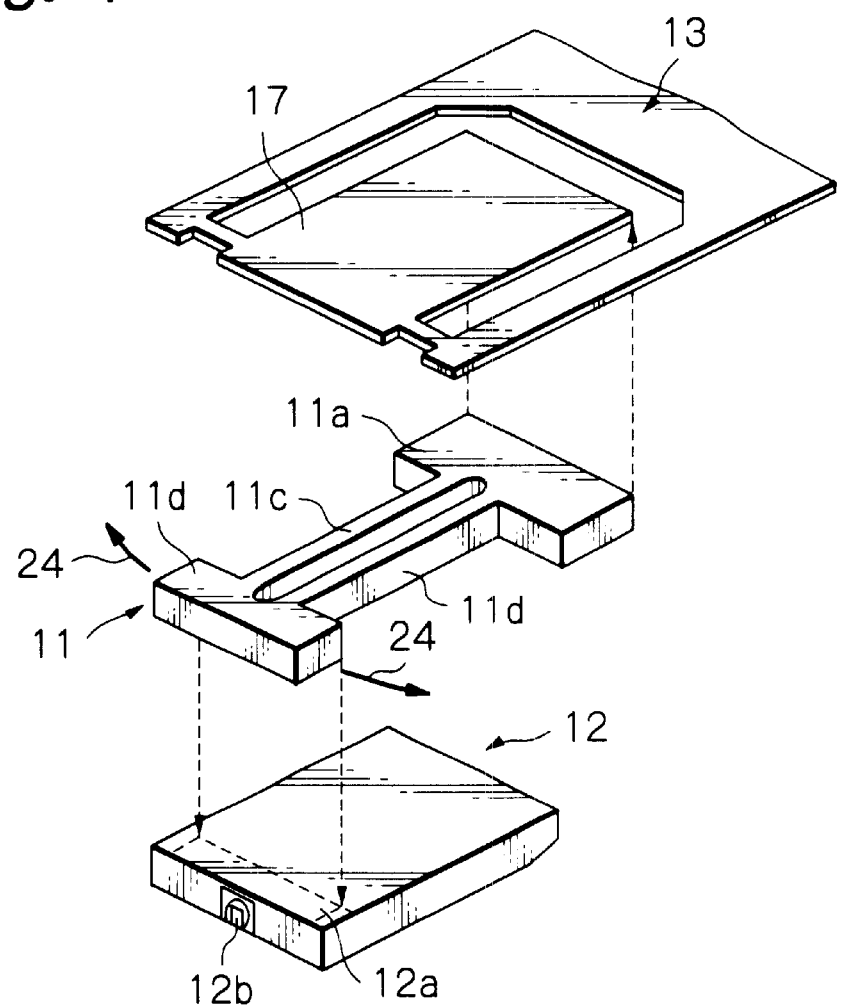
FIG. 4 is an exploded oblique view schematically illustrating an attachment structure of a precise positioning actuator and a magnetic head slider with a suspension in the head suspension assembly shown in FIG. 1.

FIG. 4 schematically illustrates an attachment structure of the actuator 11 and the magnetic head slider 12 with the flexure 13. In the figure, indication of the conductor members is omitted.

A fixed part 11a of the actuator 11 is fixed to the tongue 17 of the flexure 13. The fixing of the actuator 11 to the tongue 17 may be achieved by solder bonding terminal electrodes formed on the fixed part 11a of the actuator 11 with connection pads 22 formed on the tongue 17 of the flexure 13, by adhering using conductive adhesives the terminal electrodes formed on the fixed part 11a of the actuator 11 with connection pads 22 formed on the tongue 17 of the flexure 13, or by adhering using normal adhesives the fixed part 11a of the actuator 11 with the tongue 17 of the flexure 13. A movable part 11b of the actuator 11 is directly fixed by using adhesives to a rear end portion 12a at which side a magnetic head element 12b is formed, of the slider 12, or indirectly fixed by using adhesives to the rear end portion 12a through the top end portion 13a of the flexure 13. In this specification, "fixed coupling" means such direct or indirect fixing.

The actuator 11 consists of the fixed part 11a, the movable part 11b, and two rod shaped beam parts 11c and 11d for coupling these fixed and movable parts 11a and 11b. Each of the beam parts 11c and 11d is formed by at least one piezoelectric or electrostrictive material layer sandwiched by electrode layers. By applying voltage across the electrode layers, the piezoelectric or electrostrictive material layer expands and contracts. The piezoelectric or electrostrictive material layer is made of material that expands and contracts by reverse piezoelectric effect or by electrostrictive effect.

As aforementioned, one end of the beam parts 11c and 1id is united with the fixed part 11a and this fixed part 11a is fixed to the flexure 13. The other end of the beam parts 11c and 11d is united with the movable part 11b and this movable part 11b is fixed to the slider 12. Thus, bending motion of the beam parts 11c and 11d due to their expanding and contracting generates the displacement of the movable part 11b and therefore the displacement of the slider 12. This displacement of the slider 12 results the swing of the magnetic head element along an arc so as to cross recording tracks of the magnetic disk surface.

In case that the piezoelectric or electrostrictive material layer of the beam parts 11c and 11d is made of piezoelectric material such as PZT (Lead Zirconate Titanate), the piezoelectric material layers are in general polarized so as to improve their displacement performance. The polarized direction is the thickness direction of the actuator 11. When voltage is applied across the electrode layers and the direction of the produced electrical field is the same as the polarized direction, the piezoelectric material layer between the electrode layers expands in its thickness direction (piezoelectric longitudinal effect) and contracts in its in-plane direction (piezoelectric lateral effect). Contrary to this, when the direction of the produced electrical field is in inverse as the polarized direction, the piezoelectric material layer between the electrode layers contracts in its thickness direction (piezoelectric longitudinal effect) and expands in its in-plane direction (piezoelectric lateral effect). If the voltage with a polarity which will induce the contraction is applied to the beam parts 11c and 1id alternately, a ratio between the length of one beam part and the other beam part changes resulting that both the beam parts 11c and 11d bend toward the same direction in a plane of the actuator 11. By this bending motion, the movable part 11b swings around the fixed part 11a along the arrow 24 shown in FIG. 4. If no voltage is applied, the movable part 11b stays at the center position. This swing is the displacement of the movable part 11b to draw an arc locus in the direction substantially perpendicular to the expanding and contracting direction of the beam parts 11c and 11d and the arc locus is in a plane of the actuator 11. Therefore, the magnetic head element also swings to draw the arc locus. Thanks to the same direction between the applied voltage and the polarization in the piezoelectric material layer, no attenuation in polarization in occurs.

Similar swing motion can be obtained even if the voltage alternately applied to the beam parts 11c and 11d is that inducing expansion of the beam parts.

In the embodiment, voltages that induce mutually reverse motions may be simultaneously applied to the beam parts 11c and 11d, respectively. In other words, alternating voltages may be simultaneously applied to the beam parts 11c and 11d so that one beam part expands when the other beam part contracts and vice versa. The swing motion of the movable part 11b is centered when no voltage is applied to the beam parts. In this case, the amplitude of the swing motion of the movable part 11b becomes about twice of that when the voltage is alternately not simultaneously applied to the beam parts under the condition that the driving voltage levels are the same.

However, in this case, one of the beam parts is expanded and therefore the direction of the driving voltage opposes to that of the polarization in the piezoelectric material layer. Thus, if the applied voltage is high or the voltage is continuously applied, attenuation in polarization of the piezoelectric material layer may occur. It is desired therefore that a constant DC bias voltage in the same direction as the polarization direction is additionally applied to the alternating voltage to form the driving voltage so that the direction of the driving voltage never opposes to that of the polarization in the piezoelectric material layer. The swing motion of the movable part is centered when only the bias voltage is applied to the beam parts.

The actuator 11 has in this embodiment a united structure of the fixed part 11a, the movable part 11b, and the beam parts 11c and 11d with a hole and notches formed through a single layer or multi-layers of piezoelectric or electrostrictive material with partially formed electrode layers. Thus, high rigidity and accurate dimensions of the actuator can be expected without occurring assembling error. Also, since no adhesive is used for fabricating the actuator, no adhesive layer exists at the portion where stress will be produced by the deformation of the beam parts. Thus, no mechanical transformation loss due to the adhesive layer and no deterioration in adhesive strength occur.

In this specification, the piezoelectric or electrostrictive material is material that expands or contracts by their reverse piezoelectric effect or electrostrictive effect. Any piezoelectric or electrostrictive material applicable for the beam parts of the actuator can be used. However, for high rigidity, it is desired to use a ceramics piezoelectric or electrostrictive material such as PZT[Pb(Zr,Ti)O$_3$], PT(PbTiO$_3$), PLZT[(Pb, La)(Zr,Ti)O$_3$], or barium titanate (BaTiO$_3$).

Figure 5:
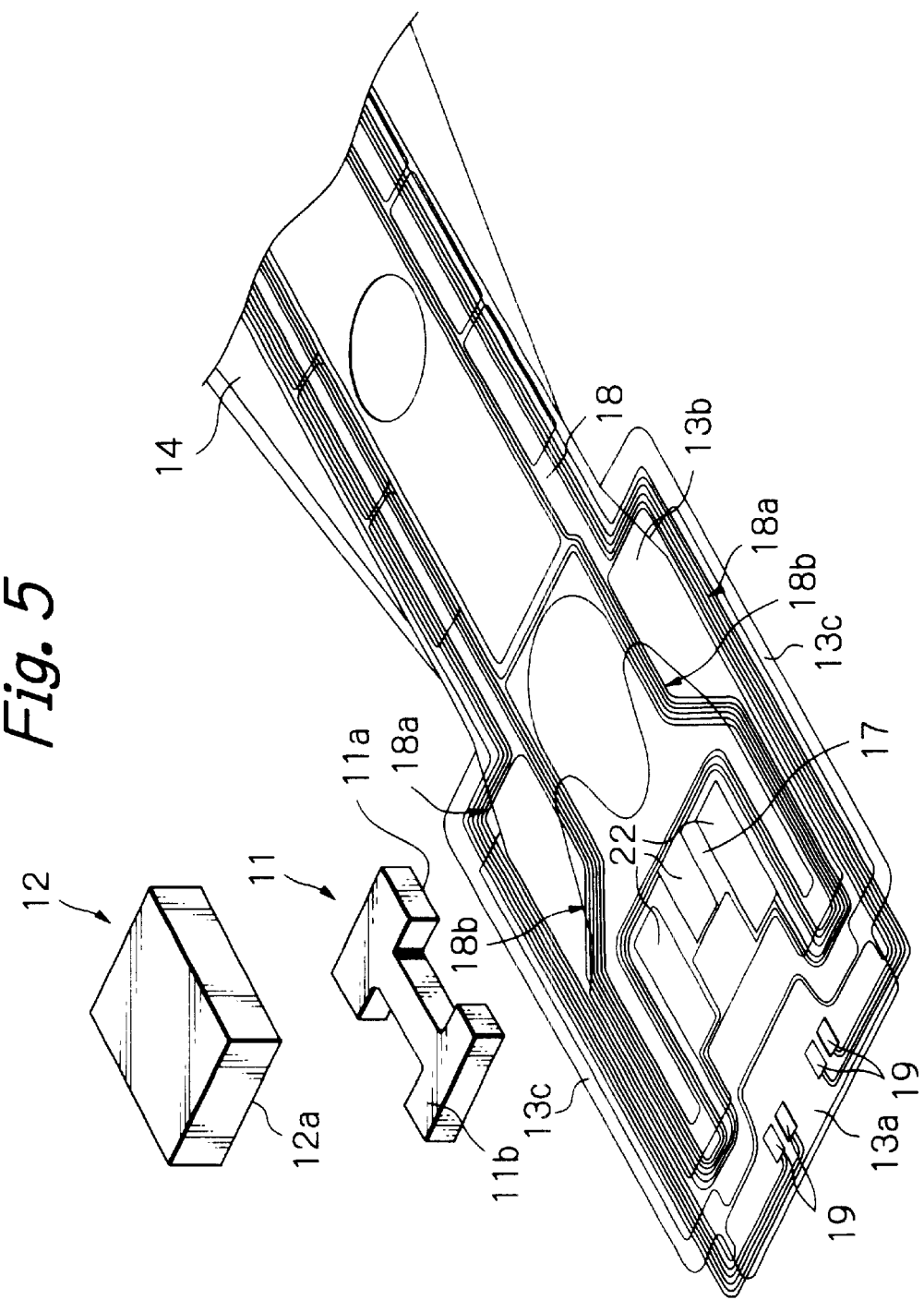
FIG. 5 is an exploded oblique view schematically illustrating a part of manufacturing processes of the head suspension assembly shown in FIG. 1.

FIG. 5 schematically illustrates a part of manufacturing processes of the head suspension assembly shown in FIG. 1.

As shown in the figure, first, the flexure 13 on which most of the flexible first and second conductor member 18a and 18b are directly formed, the load beam 14 for supporting and fixing the flexure 13, and the base plate 15 formed at the base end section of the load beam 14 are integrally fixed with each other. The top end portion 13a of the flexure 13 is not separated but is united with the other portion 13b through two resilient support tabs 13c at this stage.

Then, the fixed part 11a of the actuator 11 is fixed to the tongue 17 of the flexure 13 and the terminal electrodes of the actuator 11 are connected to the connection pads 22.

Then, the rear end portion 12a of the magnetic head slider 12 is indirectly fixed by using adhesives to the movable part 11b of the actuator 11 through the top end portion 13a of the flexure 13.

Then, the terminal electrodes of the magnetic head slider 12 are ball-bonded with the connection pads 19 on the top end portion 13a of the flexure 13 by using the Au balls 21.

Thereafter, the top end portion 13a is separated from the flexure 13 by cutting the two support tabs 13c at both sides of the flexure 13. The separation of the top end portion 13a of the flexure 13 may be performed by cutting each of the support tabs 13c at one position near the top end portion 13a, or by cutting it at two different positions near and far from the top end portion 13a so as to omit a part of the support tab 13c.

As mentioned-above, according to this embodiment, the top end portion 13a of the flexure 13 on which one end of the first conductor member 18a, which is connected to the magnetic head element is formed is individually separated from the other portion 13b of the flexure 13. Thus, it is possible to locate the first conductor member 18a in different planes and therefore a three-dimensional suspension that was difficult to fabricate according to the conventional art can be easily provided. As a result, a wireless suspension with the actuator 11 can be provided even if it has a three-pieces structure.

Furthermore, since the top end portion 13a of the flexure 13 is individually separated from the other portion 13b of the flexure 13, a part for establishing electrical connection with the actuator 11 and a part for establishing electrical connection with the magnetic head element of the lead conductor member are divided. Therefore, wireless lead conductor members can be provided without introducing any interference between the movements of the lead conductor members even when the actuator 11 displaces the position of the magnetic head element. As a result, the elasticity and the rigidity of the lead conductor members will not affect an attitude of the magnetic head. Furthermore, since the movement of the actuator 11 is absorbed by an air-floating portion of the flexible first lead conductor member 18b, electrical and/or mechanical break at the electrical connection part with the magnetic head element can be prevented from occurring.

Since no wire connection is used for establishing electrical connections with the actuator 11 and the magnetic head element, no wire-forming process is needed resulting improvement in productivity and improvement in the resistance characteristics against static electricity.

In addition, according to the embodiment, since cutting of the top end portion 13a of the flexure 13 is performed after assembling of the magnetic head slider, the actuator and the suspension, the workability of the assembly process is never reduced.

The advantages of the embodiment are as follows:

(1) A wireless suspension with an actuator mounted thereon, which was considered as difficult to fabricate can be provided;

(2) A wireless lead lines can be provided without reducing moving performance of the actuator and workability of the head suspension assembly; and (3) A three-dimensional suspension can be provided and thus the actuator can be easily mounted on a suspension with a three-pieces structure.

Figure 6:
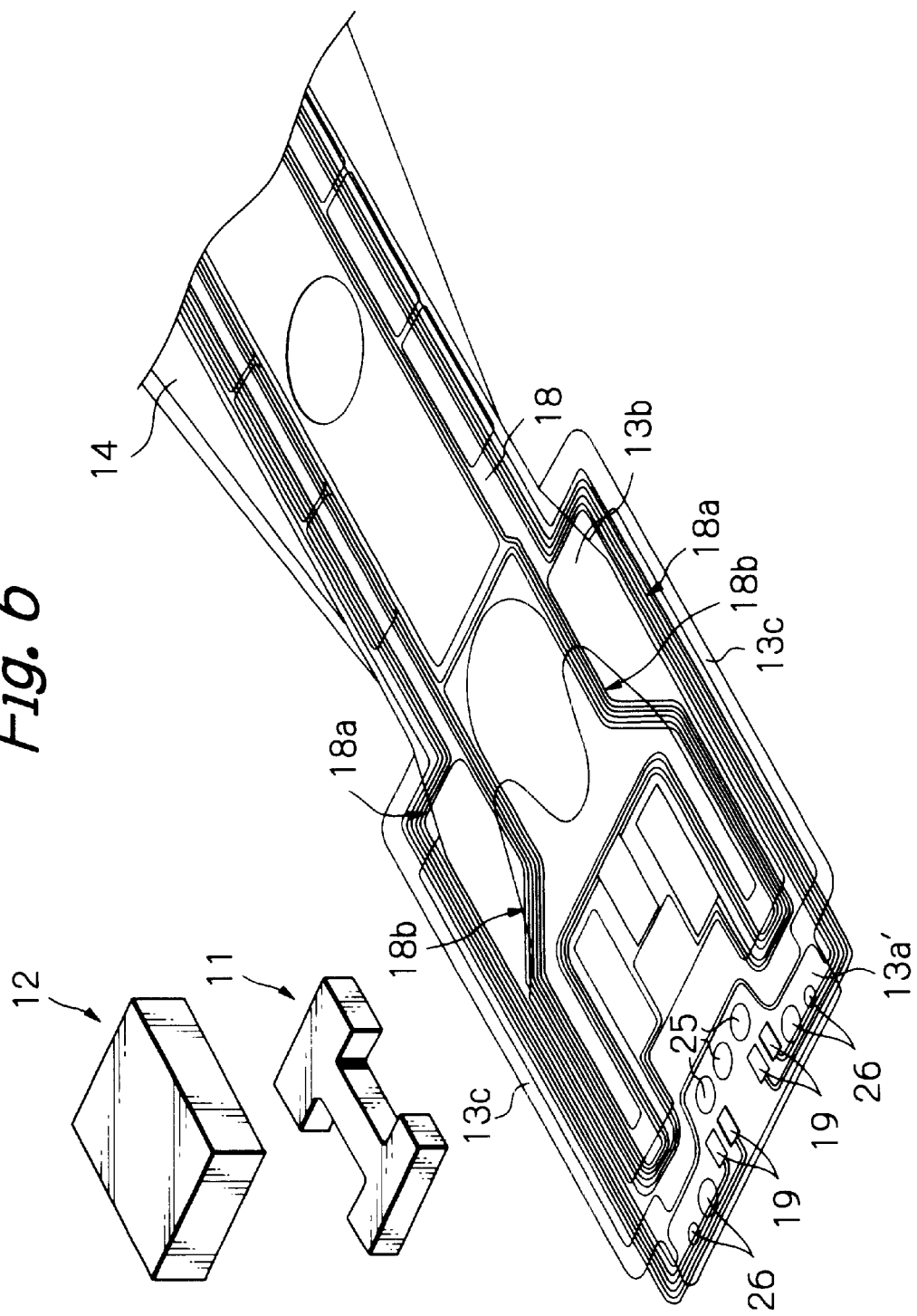
FIG. 6 is an exploded oblique view schematically illustrating a part of manufacturing processes of a head suspension assembly in another embodiment according to the present invention.

FIG. 6 schematically illustrates a part of manufacturing processes of a head suspension assembly in another embodiment according to the present invention.

This embodiment differs from the embodiment of FIG. 1 only in that a top end portion 13a' of a flexure 13 has a plurality of via holes 25 and 26. Thus, in FIG. 6, using the same reference numerals indicates the same elements as these in the embodiment of FIG. 1.

The via holes 25 and 26 are aimed to reduce the weight of the top end portion 13a' and therefore to give the part 13a' a frisky movement. The via holes 25 are further aimed to directly adhere a magnetic head slider 12 with an actuator 11 through the via holes 25.

It is desired that the via holes 25 and 26 have a circular shape as shown in the figure, but they may have a rectangular shape or another shape. The size of the via holes 25 and 26 will be optionally determined.

Another constitutions, modifications and advantages in this embodiment are the quite same as those in the embodiment of FIG. 1.

Figure 7:
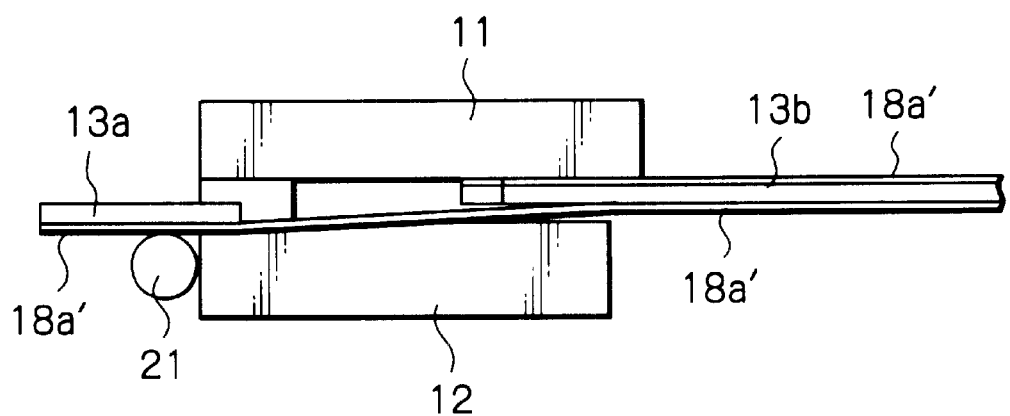
FIG. 7 is a side view schematically illustrating three-dimensional structure of a top end section of a head suspension assembly in a further embodiment according to the present invention.

FIG. 7 schematically illustrates a three-dimensional structure of a top end section of a head suspension assembly in a further embodiment according to the present invention.

In this embodiment, a suspension is formed in a two-pieces structure with a base plate and a flexure-load beam that is a single component sharing a flexure and a load beam. An actuator 11 and a magnetic head slider 12 are mounted on opposite surfaces of the suspension, respectively.

Particularly, in this embodiment, a first lead conductor member 18a' connected to a magnetic head element is mounted on one surface of the flexure-load beam, and a second lead conductor member 18b' connected to the actuator 11 is mounted on the other surface of the flexure-load beam.

Another constitutions, modifications and advantages in this embodiment are the quite same as those in the embodiment of FIG. 1. Of course, in FIG. 7, using the same reference numerals indicates the same elements as these in the embodiment of FIG. 1.

Figure 8:
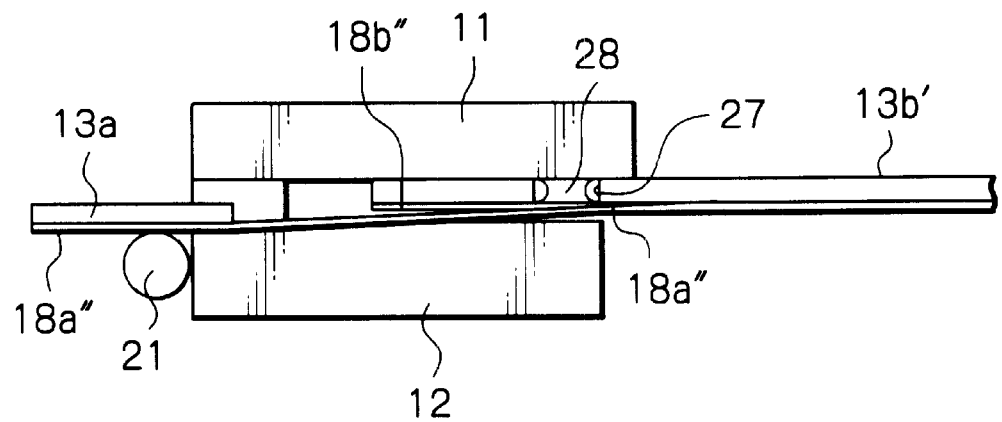
FIG. 8 is a side view schematically illustrating three-dimensional structure of a top end section of a head suspension assembly in a still further embodiment according to the present invention.

FIG. 8 schematically illustrates a three-dimensional structure of a top end section of a head suspension assembly in a still further embodiment according to the present invention.

In this embodiment, a suspension is formed in a two-pieces structure with a base plate and a flexure-load beam that is a single component sharing a flexure and a load beam. An actuator 11 and a magnetic head slider 12 are mounted on opposite surfaces of the suspension, respectively.

Particularly, in this embodiment, a first lead conductor member 18a" connected to a magnetic head element and a second lead conductor member 18b" connected to the actuator 11 is mounted on one surface of the flexure-load beam. Thus, a via section 27 for connecting the actuator with one end of the second lead conductor member 18b" is formed in the other part 13b' of the flexure. By a soldered conductor 28 passing through the via section 27, terminal electrodes of the actuator 11 is electrically connected to and mechanically fixed to connection pads that are connected to one end of the second lead conductor member 18b".

Another constitutions, modifications and advantages in this embodiment are the quite same as those in the embodiment of FIG. 1. Of course, in FIG. 8, using the same reference numerals indicates the same elements as these in the embodiment of FIG. 1.

Many widely different embodiments of the present invention may be constructed without departing from the spirit and scope of the present invention. It should be understood that the present invention is not limited to the specific embodiments described in the specification, except as defined in the appended claims.

What is claimed is:

1. A head suspension assembly comprising:

a support member further comprising a first part and a second part, said first part being individually separated from said second part;

a magnetic head slider with at least one magnetic head element;

an actuator fixed to said second part of said support member and also fixed to said magnetic head slider such that precise positioning of said at least one thin-film magnetic head element is enabled by said actuator;

a flexible first lead conductor member with one end electrically connected to said at least one thin-film magnetic head element, at least a portion of said first lead conductor member being formed on said first part of said support member and an adjacent portion of said first lead conductor being unattached to said first part of said support member; and a second lead conductor member with one end electrically connected to said actuator, at least a portion of said second lead conductor member being formed on said second part of said support member.

2. The head suspension assembly as claimed in claim 1, wherein said actuator and said magnetic head slider are located at one face side of said second part of said support member.

3. The head suspension assembly as claimed in claim 2, wherein said support member includes a resilient load beam and a resilient flexure supported by said load beam, and wherein at least part of said first and second lead conductor members are formed on one face of said flexure.

4. The head suspension assembly as claimed in claim 2, wherein said support member includes a resilient flexure-load beam, and wherein at least part of said first and second lead conductor members are formed on one face of said flexure-load beam.

5. The head suspension assembly as claimed in claim 1, wherein said magnetic head slider is located at one face side of said second part of said support member and said actuator is located at the other face side of said second part of said support member.

6. The head suspension assembly as claimed in claim 5, wherein said support member has a via section, and wherein said actuator is connected to said one end of said second lead conductor member through said via section.

7. The head suspension assembly as claimed in claim 5, wherein said support member includes a resilient flexure-load beam, and wherein at least part of said first and second lead conductor members are formed on one face of said flexure-load beam.

8. The head suspension assembly as claimed in claim 1, wherein said first part and said second part of said support member are located in different planes, and wherein said first lead conductor member freely curves from said first part to said second part.

9. The head suspension assembly as claimed in claim 1, wherein said first part of said support member has at least one via hole.

10. The head suspension assembly as claimed in claim 9, wherein said actuator is directly fixed to said magnetic head slider through said at least one via hole.

11. The head suspension assembly as claimed in claim 9, wherein said at least one via hole is via holes for reducing a weight of said first part.

12. The head suspension assembly as claimed in claim 1, wherein said one end of said first lead conductor member is directly connected to terminals of said at least one thin-film magnetic head element by ball bonding.

13. The head suspension assembly as claimed in claim 1, wherein said one end of said first lead conductor member is connected to terminals of said at least one thin-film magnetic head element by stitch bonding.

14. The head suspension assembly as claimed in claim 1, wherein said first and second lead conductor members are formed by flexible print circuits with lead conductor layers sandwiched by insulation layers.

\* \* \* \* \*